H. G. GARCELON.
Device for Protecting Horses' Feet.
No. 240,247.  Patented April 19, 1881.
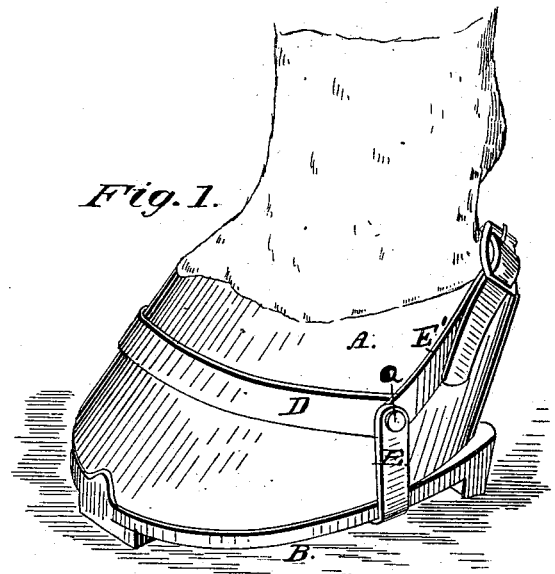
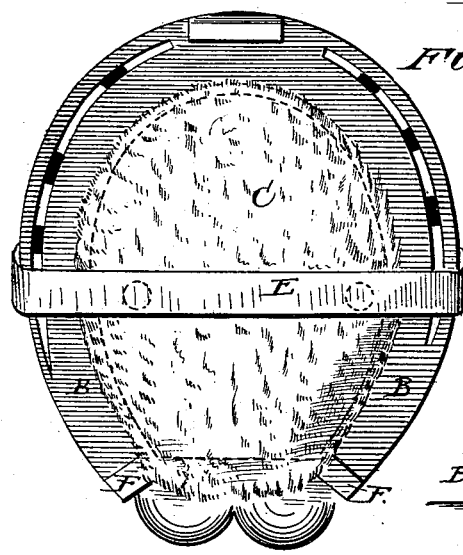
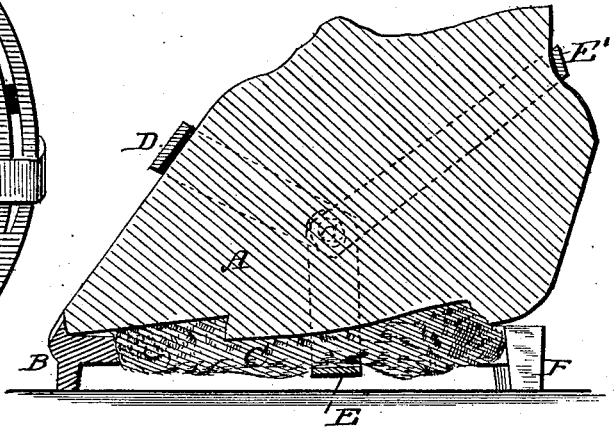

UNITED STATES PATENT OFFICE.

HORATIO G. GARCELON, OF AUBURN, MAINE.

DEVICE FOR PROTECTING HORSES' FEET.

SPECIFICATION forming part of Letters Patent No. 240,247, dated April 19, 1881.

Application filed September 6, 1879.

*To all whom it may concern:*

Be it known that I, HORATIO G. GARCELON, of Auburn, in the county of Androscoggin and State of Maine, have invented certain new and useful Improvements in Devices for Protecting Horses' Feet; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a bottom view; and Fig. 3 is a vertical sectional view.

Corresponding parts in the several figures are denoted by like letters of reference.

This invention relates to a peculiarly-constructed strap for holding a sponge or fibrous pad saturated with moisture under a horse's foot, for the prevention and cure of hard, dry, and contracted feet, as will be hereinafter more fully described, and particularly pointed out in the claim.

In the drawings, A represents a horse's hoof, B the shoe, and C a sponge or fibrous pad fitted within the latter and capable of receiving and retaining moisture.

D is a strap passed over the front of the hoof and down toward its rear corners, where its ends are attached by rivets *a* to a strap, E, passing under the hoof and shoe, so as to secure the sponge or pad C in position.

E' E' represent straps secured by the rivets *a* to the ends of strap D, from whence they pass back over the heel, where they are connected by a buckle or its equivalent, thereby serving to secure the device in position. The several straps, being connected by the rivets *a a*, may be easily adjusted so as to fit nicely upon the hoof of the horse, for the purpose above indicated.

The calks F F, if of ordinary height, will usually be found sufficient to keep the strap E off contact with the floor, and thus prevent it from being worn out at the sides; but suitable slots or recesses for the accommodation of said strap may be formed in the horseshoe without departing from the spirit of my invention. A metallic or other plate may also be affixed to strap E, for the purpose of protecting the pad, as shown in Fig. 2 of the drawings.

The strap D is held in place and prevented from slipping down by the shape or enlargement of the hoof. The straps E' E' pass over the heel and into a recess on the back of the hoof, and so are also kept in place.

I am aware of the patent to Wemple, June 18, 1878, and I claim nothing therein shown. Having a single bottom strap, my device may be fitted upon any horse-foot, which is impossible with devices having more than one bottom strap unless they are adjustable, in which event complication, expensiveness, and liability of disarrangement is the result.

Having thus described my invention, I claim and desire to secure by Letters Patent of the United States—

In combination with a pad, C, the strap D, held in place by the conformation of the hoof and united to the straps E and E' by the rivets *a*, the strap E, and adjustable straps E' E', held in position by the heel of the hoof, as herein set forth.

In testimony that I claim the foregoing as my own I have hereto affixed my signature in presence of two witnesses.

HORATIO G. GARCELON.

Witnesses:
CHAS. E. WING,
J. W. MAXWELL.